United States Patent Office 2,975,808
Patented Mar. 21, 1961

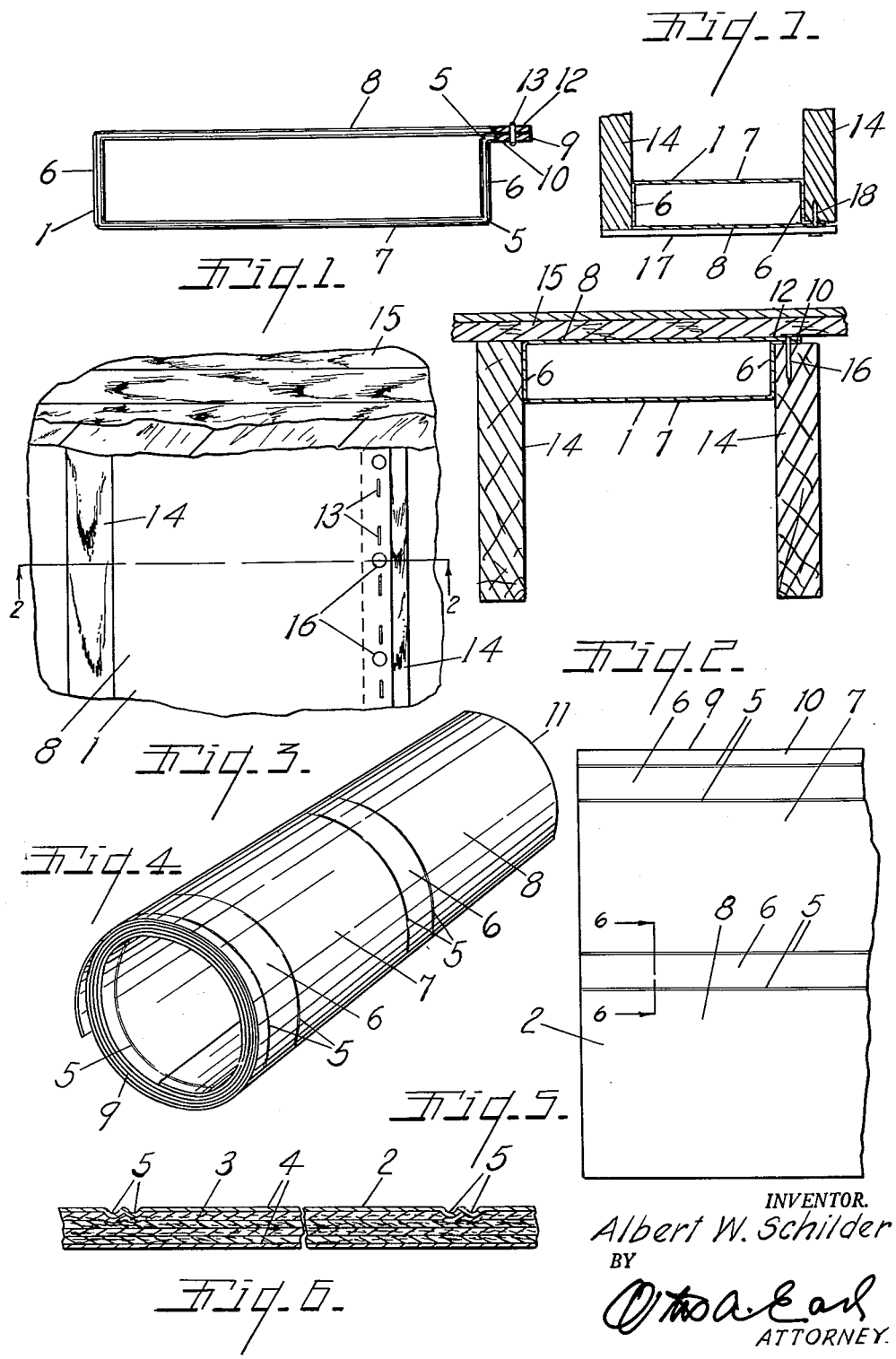

2,975,808

CONDUIT AND FABRICATING MATERIAL THEREFOR

Albert W. Schilder, Marshall, Mich., assignor to Lynn Corporation, Inc., Marshall, Mich.

Filed Dec. 10, 1956, Ser. No. 627,334

6 Claims. (Cl. 138—74)

This invention relates to a conduit and fabricating material therefor which enables the rapid and economical forming of conduits of desired length at the place where they are to be installed and the shipping and transportation of the material in the form of rolls.

The main objects of this invention are:

First, to provide a material particularly desirable for use in forming conduits for gaseous products such as hot air heating systems or cooled or humidified air in air conditioning systems which enables the rapid and economical production of conduits of various lengths and is highly effective in preventing heat exchange through the wall of the conduit.

Second, to provide a conduit having these advantages which may be quickly installed in relation to joists or studding and the like.

Third, to provide a laminated elongated web like body of fiberboard with a ply of aluminum or like metal foil on one side thereof and coextensive therewith and bonded thereto so that the metal foil is effectively supported.

Objects relating to details and economies of the invention will appear from the description to follow. The invention is defined and pointed out in the claims.

A preferred embodiment of the invention is illustrated in the accompanying drawing, in which:

Fig. 1 is an end elevational view of a conduit embodying my invention, partially in section to show one of the fastener elements.

Fig. 2 is a fragmentary view in section on a line corresponding to line 2—2 of Fig. 3 illustrating one installation or adaptation of my conduit in relationship to structural elements such as joists.

Fig. 3 is a fragmentary plan view of the embodiment of Fig. 2.

Fig. 4 is a perspective view of a roll of conduit material of my invention.

Fig. 5 is a fragmentary plan view thereof.

Fig. 6 is an enlarged fragmentary view in section on a line corresponding to line 6—6 of Fig. 5.

Fig. 7 is a fragmentary view corresponding to that of Fig. 2 illustrating another adaptation of the conduit of my invention in relationship to structural elements.

In the accompanying drawing I have illustrated both the conduit designated generally by the numeral 1 and the material for forming the same designated by the numeral 2.

The conduit 1 is formed of material, certain details of which are illustrated in Fig. 5 and comprising an elongated web-like fiberboard body 3 with aluminum foil 4 adhesively bonded to each side of the body thereof and coextensive therewith, the body is desirably fibrous material impregnated with asphaltum.

I have illustrated in Fig. 6 that the body is made up of laminations but it might be a single ply, the laminating type being advantageous to secure a body web of the desired thickness. The web has longitudinal laterally spaced pairs of scores 5, preferably double scores as illustrated in Fig. 6. The pairs of scores are spaced to provide opposed wall portions 6—6. The pairs of scores are spaced to provide opposed wall portions 7 and 8, the outer of one pair of scores 5 is spaced from the longitudinal edge 9 of the web to provide a flange section 10. The outer of the other pair of scores 5 is spaced from the other edge 11 of the web to provide the side wall 8 and a flange portion 12 adapted to lap upon the flange portion 10 and be secured thereto by the staple like fasteners 13. This forms a complete conduit and as the material is in the form of an elongated web the conduits may be formed of varying length to meet particular installation requirements.

In Figs. 2 and 7 I illustrate different manners of installing the conduits.

Considering Figs. 2 and 3, the numeral 14 represents joists or studding and 15 flooring or wall. In this adaptation the conduit is positioned between the studding or joists and attached to one of them by nails 16 driven through the flange portions of the conduit.

In the embodiment shown in Fig. 7 the conduit 1 is arranged on the underside of the members 14 and secured in position by the crosspieces 17 secured by the nails 18. The method of installing shown in Fig. 7 is desirable where the conduits are installed after the building is completed.

The conduits of my invention are particularly desirable for use in heating systems or in air conditioning systems and may be very economically fabricated and are highly efficient in preventing the radiation or loss of heat through the wall of the conduit or vice versa in air conditioning systems.

Applicant is familiar with commercial insulating material consisting of a web like body or sheet of fiberboard laminated with metal foil.

I have illustrated and described my invention in a highly practical embodiment thereof. I have not attempted to illustrate and describe other embodiments or adaptations which I contemplate as it is believed that this disclosure will enable those skilled in the art to embody or adapt the invention as may be desired.

Having thus described the invention, what is claimed as new and is desired to be secured by Letters Patent is:

1. As an article of manufacture, an elongated laminated web adapted to be laterally folded into an elongated conduit and comprising, an elongated web-like body of fibrous material impregnatingly bonded with asphaltum and plies of aluminum foil co-extensive with the body and supportedly bonded throughout to each side thereof, the web having laterally spaced pairs of longitudinally extending laterally spaced parallel wall and flange defining scores on one side thereof facilitating folding thereof on predetermined lines into an elongated conduit, the outer of one pair of scores being adjacent to but spaced from one longitudinal edge of the web defining therewith a relatively narrow flange section, the outer of the other pair of scores being spaced from the other edge of the web a distance equal to the spacing of the inner scores of the pairs of scores plus the width of said flange section so that the web may be folded on its said scores into a conduit with an edge portion of said last defined section in overlapping sealing relation to said flange section for attachment in such relation to an elongated support member.

2. As an article of manufacture, an elongated laminated web adapted to be laterally folded into an elongated conduit and comprising, an elongated web-like body of fiber board and plies of aluminum foil co-extensive with the body and supportedly bonded throughout to each side thereof, the web having laterally spaced pairs of longitudinally extending laterally spaced parallel wall and flange defining scores on one side thereof facilitating folding thereof on predetermined lines into an elongated conduit, the outer of one pair of scores being adjacent to but spaced from one longitudinal edge of the web defining therewith a relatively narrow flange section, the outer of the other pair of scores being spaced from the other edge of the web a distance equal to the spacing of the inner scores of the pairs of scores plus the width of said flange section so that the web may be folded on its said scores into a conduit with an edge portion of said last defined section in overlapping sealing relation to said flange section for attachment in such relation to an elongated support member.

3. As an article of manufacture, an elongated web adapted to be laterally folded into an elongated conduit and comprising, an elongated web-like body of fiber board and a ply of aluminum foil co-extensive with the body and supportedly bonded throughout to each side thereof, the web having laterally spaced pairs of longitudinally extending laterally spaced parallel wall and flange defining scores on one side thereof facilitating folding thereof on predetermined lines into an elongated conduit, the outer of one pair of scores being adjacent to but spaced from one longitudinal edge of the web defining therewith a relatively narrow flange section, the outer of the other pair of scores being spaced from the other edge of the web a distance equal to the spacing of the inner scores of the pairs of scores plus the width of said flange section so that the web may be folded on its said scores into a conduit with an edge portion of said last defined section in overlapping sealing relation to said flange section for attachment in such relation to an elongated support member.

4. As an article of manufacture an elongated web adapted to be laterally folded into an elongated conduit and comprising, an elongated web-like body of fibrous material having a ply of metal foil co-extensive therewith and supportedly bonded thereto, the web having longitudinally extending parallel laterally spaced conduit wall and attaching flange defining scores, one of the outer score being spaced from the edges of the web to define laterally projecting support engaging members adapted to be overlappingly positioned on an elongated support member and secured thereto for supporting the conduit therefrom and sealing the overlapping parts of the conduit.

5. As an article of manufacture a rolled elongated web of fiber board adapted when unrolled to be laterally folded into an elongated conduit and comprising, an elongated web-like body of fibrous material having a ply of metal foil co-extensive therewith and supportedly bonded thereto, the web having longitudinally extending laterally spaced conduit wall member and attaching member defining scores facilitating folding on predetermined lines into an elongated conduit with attaching elements projecting laterally from the conduit for supported engagement with and attachment to a support member and to sealingly engage the overlapping parts of the conduit when attached to the support member.

6. As an article of manufacture an elongated web of fiber board adapted to be laterally folded into an elongated conduit and comprising, an elongated web-like body of fibrous material having a ply of metal foil co-extensive therewith and supportedly bonded thereto, the web having longitudinally extending laterally spaced conduit wall member and attaching member defining scores facilitating folding on predetermined lines into an elongated conduit with attaching elements projecting laterally from the conduit wall for supported engagement with and attachment to a support member and sealingly engage the said overlapping parts of the conduit so attached to an elongated support member.

References Cited in the file of this patent

UNITED STATES PATENTS

| | | |
|---|---|---|
| 1,055,173 | Hodkinson | Mar. 4, 1913 |
| 1,781,649 | Sebrell | Nov. 11, 1930 |
| 1,785,025 | Felsenthal | Dec. 16, 1930 |
| 1,862,301 | Drexler | June 7, 1932 |
| 2,159,948 | Hatch | May 23, 1939 |
| 2,298,146 | Mersbach | Oct. 6, 1942 |
| 2,378,272 | Whitaker | June 12, 1945 |
| 2,529,884 | Reynolds | Nov. 14, 1950 |
| 2,643,593 | Lenard et al. | June 30, 1953 |
| 2,734,676 | Lawrence | Feb. 14, 1956 |
| 2,749,262 | Wiser | June 5, 1956 |
| 2,777,786 | Schwartz et al. | Jan. 15, 1957 |
| 2,821,896 | Kice et al. | Feb. 4, 1958 |